United States Patent [19]

Hesseltine

[11] Patent Number: 5,343,627
[45] Date of Patent: Sep. 6, 1994

[54] METHOD AND MEANS FOR MEASURING SQUARENESS OF PLATE STRUCTURES

[76] Inventor: Dennis R. Hesseltine, 1208 15th St., W. Des Moines, Iowa 50265

[21] Appl. No.: 65,067
[22] Filed: May 24, 1993
[51] Int. Cl.⁵ .............................. G01B 3/56
[52] U.S. Cl. ...................... 33/535; 33/551
[58] Field of Search .............. 33/533, 535, 549, 551, 33/553, 554, 555, 32.1, 32.3, 832, 833, 501.02, 549, 561

[56] References Cited

U.S. PATENT DOCUMENTS

| Re. 34,078 | 9/1992 | Hesseltine | 33/783 |
|---|---|---|---|
| 1,488,818 | 4/1924 | Johansson et al. | 33/549 |
| 1,671,737 | 5/1928 | Norton | 33/501.02 |
| 2,772,484 | 12/1956 | Cargill et al. | 33/535 |
| 3,618,219 | 11/1971 | Kelly | 33/535 |
| 3,978,589 | 9/1976 | Courtepatte et al. | 33/803 |
| 4,120,093 | 10/1978 | Spies | 33/533 |
| 4,122,607 | 10/1978 | Hopf | 33/555 |
| 4,208,796 | 6/1980 | Michaud et al. | 33/561 |
| 4,366,623 | 1/1983 | Bergqvist | 33/763 |
| 4,593,473 | 6/1986 | Shimomura | 33/551 |
| 4,606,129 | 8/1986 | Barrowman et al. | 33/533 |
| 4,674,194 | 6/1987 | Riley | 33/551 |
| 5,058,284 | 10/1991 | Stevenson | 33/535 |
| 5,205,046 | 4/1993 | Barnett et al. | 33/533 |

FOREIGN PATENT DOCUMENTS

| 58-85108 | 5/1983 | Japan | 33/551 |
|---|---|---|---|
| 792869 | 4/1958 | United Kingdom | 33/535 |
| 1370145 | 10/1974 | United Kingdom | 33/535 |

OTHER PUBLICATIONS

Precision Measuring Table—Lee Machine & Mfg. Inc. (no date).

Primary Examiner—William A. Cuchlinski, Jr.
Assistant Examiner—G. Bradley Bennett
Attorney, Agent, or Firm—Zarley, McKee, Thomte, Voorhees & Sease

[57] ABSTRACT

An apparatus and method for measuring the squareness of fabricated plate structures by providing a measuring table having a straight reference gauge extending squarely across the table, and a plunger-operated measuring gauge rigidly mounted on a carriage which is slidably mounted to the underside of the table so as to slide the plunger at right angles to the reference gauge, positioning the plate on the measuring table with a first edge abutting the straight reference gauge, retracting the plunger, moving the carriage which holds the measuring gauge to a position in front of a second edge of the plate, releasing the plunger slowly until it contacts the second edge, activating the measuring gauge, moving the carriage along the length of the second edge and holding the plunger in constant and continuous contact with the second edge to measure deviations from squareness between the first and second edges with the measuring gauge, moving the carriage and gauge with plunger mounted thereon clear of the plate, and repeating the above steps as needed to determine the squareness of other plate edges.

12 Claims, 2 Drawing Sheets

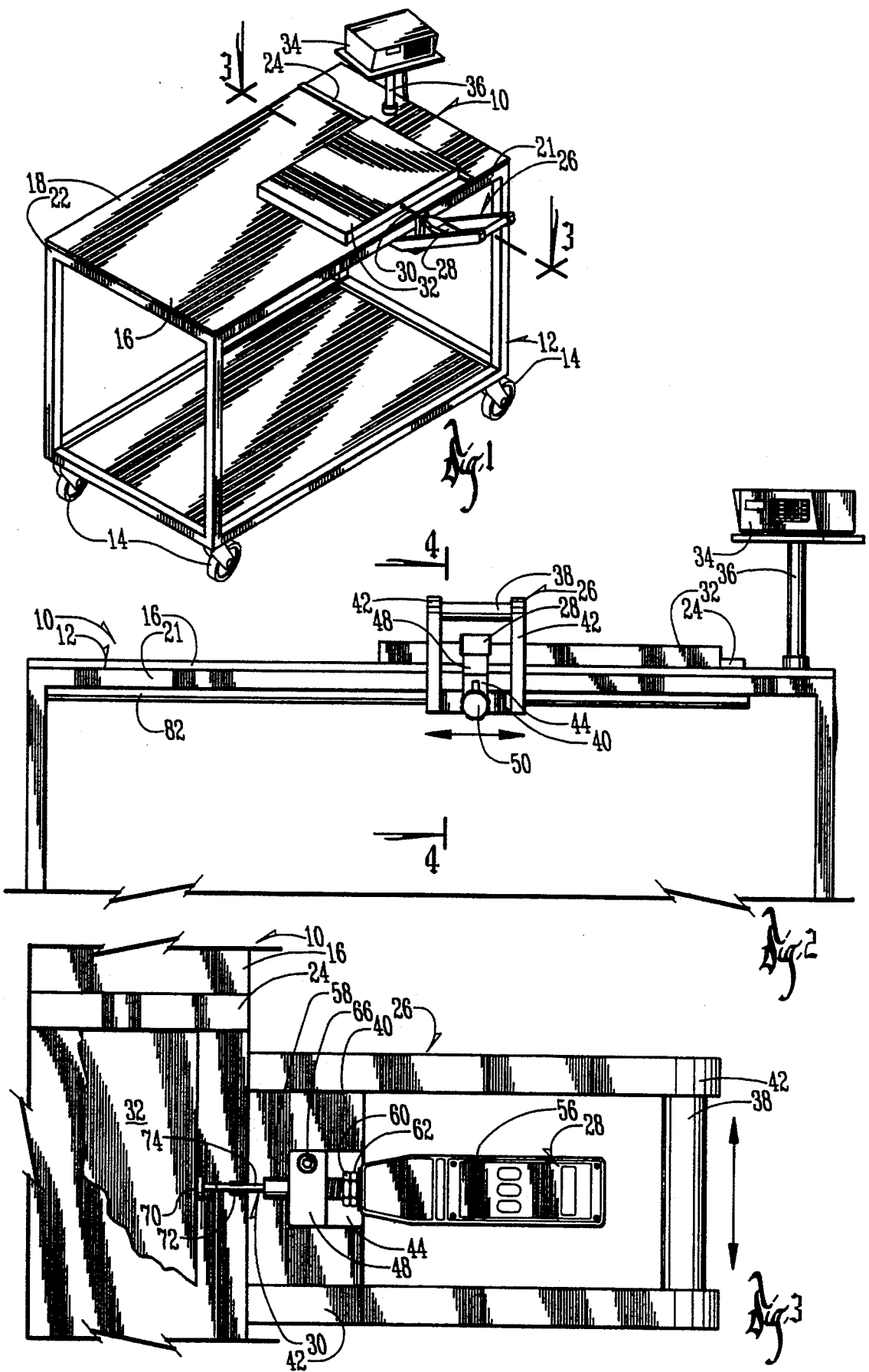

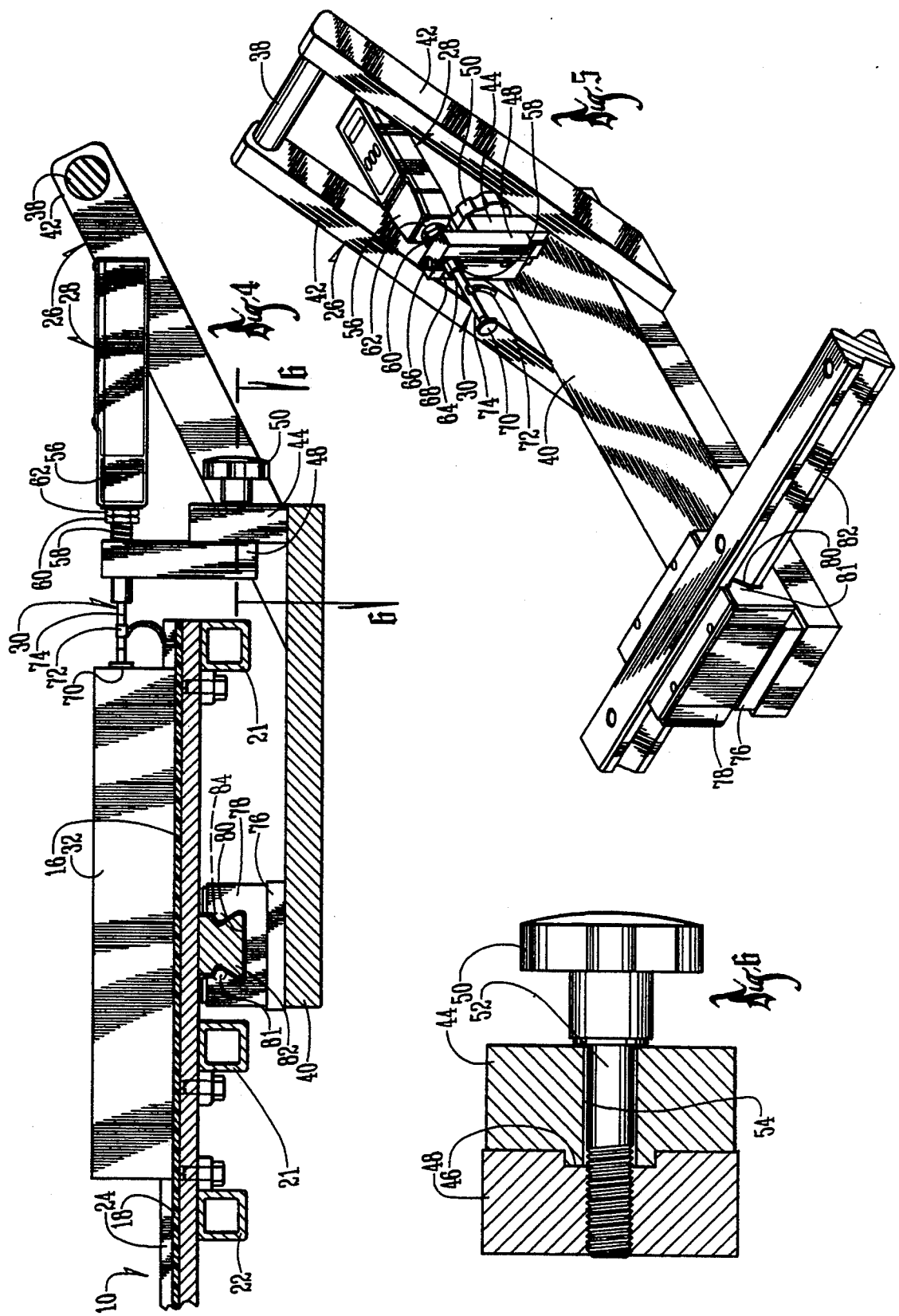

METHOD AND MEANS FOR MEASURING SQUARENESS OF PLATE STRUCTURES

BACKGROUND OF THE INVENTION

The field of this invention includes methods and equipment for measuring fabricated plate structures. Sheet metal and other structural plate products are conventionally cut to size and shape. Apertures in the plate are punched or otherwise created. Such processing proceeds according to predetermined design considerations. Quality control requires that the finished plates be remeasured to confirm the accuracy of their length, width, precise location of the apertures, and squareness.

Heretofore, it has been a practice in such quality control operations to utilize a table surface with a straight gauge means as a reference for measurements. Electronic measuring devices have been associated with the reference and a digital display to measure the length of plates.

Reissue patent U.S. Pat. No. Re. No. 34,078 brought an improvement to the art of measuring plates with a selectively retractable pin in the slot of a measuring table. This improvement made the measuring table a more powerful, convenient tool for determining plate length in an industrial quality control operation. However, some types of dimensional conformities are still difficult to verify on a measuring table. For instance, squareness and perpendicularity of plate edges are difficult to verify on conventional measuring tables.

Therefore, it is a principal object of this invention to provide a method and means for measuring the squareness of plate edges on a measuring table.

It is a further object of this invention to provide a measuring table attachment for measuring squareness which can squarely traverse the length of the table relative to a straight reference gauge with minimal interference with measuring activity above the table and clearance about the table.

It is a further object of this invention to provide a gauge generating a digital signal indicative of squareness capable of being processed by the gauge itself or an existing digital readout on the table.

It is a further object of this invention to provide a mounting and conveying structure which protects the gauge so mounted and conveyed from damage due to collisions.

It is a further object of this invention to provide a measuring device which minimizes the number of measurements required on the measuring table to verify squareness.

It is further an object of this invention to provide additional functions on a measuring table so squareness can be measured, the handling of plates is reduced, and off-table measurements are avoided.

These and other objects will be apparent to those skilled in the art.

SUMMARY OF THE INVENTION

The apparatus of this invention comprises an improvement to a measuring table for fabricated plate products, such as sheet metal and the like. A measuring table having legs for support of flat table surfaces with opposite sides and ends is equipped with a straight reference gauge extending squarely across the table surfaces near one end. The improvement to such a measuring table comprises a carriage arm assembly slidably mounting a gauge for measuring plate edges squarely adjacent to a side of the table for movement whereby the gauge remains square (perpendicular or at right angles to) to the straight reference gauge.

The method of this invention comprises the steps of positioning the plate to be measured on the table surface with one edge abutting the straight reference gauge retracting the plunger of the measuring gauge, moving the carriage arm and the measuring gauge which is mounted thereon to a position in front of a second edge of the plate, releasing the plunger slowly until it contacts the second edge, activating the measuring gauge, moving the carriage arm along the length of said second edge to measure squareness of the two edges, moving the carriage arm and gauge with plunger mounted thereon clear of the plate, and repeating the above steps as needed to check the squareness of opposite corner.

BRIEF DESCRIPTION OF THE DRAWINGS

FIG. 1 is a perspective view of a measuring table equipped with the squareness checking means of this invention.

FIG. 2 is a front view of a measuring table equipped with the squareness checking means of this invention.

FIG. 3 is an enlarged top view of the squareness checking means and method of this invention.

FIG. 4 is a sectional view of the measuring table with the squareness checking means slidably attached.

FIG. 5 is a perspective view of the squareness checking means showing the slidable mounting of the arm to the dovetailed mounting bar.

FIG. 6 is a cross-sectional view of the vertically adjustable mounting means for the gauge used in this invention.

DESCRIPTION OF THE PREFERRED EMBODIMENT

The numeral 10 designates the measuring table to which this invention applies. In FIG. 1, table 10 has a rectangular frame 12 which is supported by wheels 14. Rectangular table surfaces 16 and 18 are mounted on frame 12. FIG. 4 shows that table surface 16 is supported on frame members 21 and table surface 18 is supported on frame members 22.

A straight reference gauge 24 is mounted to the tops of table surfaces 16 and 18, so as to extend across them at right angles. A carriage arm assembly 26 is slidably mounted to frame 12, in a position which does not substantially interfere with the measuring activity above the table. The preferred location is below table surfaces 16 and 18, as shown in FIG. 4.

Referring again to FIG. 1, a measuring apparatus with digital readout 28, having an elongated plunger 30 for measuring by contact of its free end with the edge of plate 32 is adjustably mounted to carriage arm assembly 26. A conventional microprocessor control 34 is located on a mounting stand 36 on the top of table surface 18 and behind straight reference gauge 24. Microprocessor 34 and measuring apparatus 28 are both digital and could be electrically connected. Therefore, it is contemplated by the inventor that microprocessor 34 could easily receive, store, process and display signals from measuring apparatus 28.

FIG. 2 shows that handle 38 allows carriage arm assembly 26 to be slid along the length of table 10. Main support of the slidable carriage arm assembly 26 is provided by an elongated horizontal bar 40 having a rectangular cross-section. One end of bar 40 extends under table surface 16 where it is slidably attached, as shall be discussed later, and the other end extends beyond the front edge of table surface 16. Brackets 42 are attached to the sides of the protruding portion of bar 40 and extend upwardly at an angle therefrom. The lower portion of brackets 42 are mitered flush with the bottom face of bar 40 to minimize weight, streamline the design and maximize the clearance area under measuring table 10. The upper portion of brackets 42 extend above measuring apparatus 28 where they are connected by horizontal handle 38.

Handle 38 is cylindrical and long enough that the operator can conveniently grasp it with one hand to slide the carriage arm assembly 26. Conventional measuring apparatus such as 28 are expensive, delicate, and precise instruments. As shown in FIGS. 1–5, brackets 42 and handle 38 partially encompass measuring apparatus 28. Therefore, they shield measuring apparatus 28 from collisions from the sides or above.

As shown in FIG. 2, the vertical adjusting bracket 44, having a keyway 46 in the face shown, is mounted to the top face of bar 40. Adjusting bracket 44, gauge holder 48, and hand knob 50 cooperate to vertically adjust and lock the position the measuring apparatus 28 above the table surface 16, preferably at a height approximately one-half the thickness of the plate 32 being measured. Therefore, measuring apparatus 28 is securely, but adjustably mounted so that its spring-loaded plunger 30 extends horizontally and parallel to straight reference gauge 24. Vertical adjustment of the measuring apparatus 28 and its plunger 30 is further facilitated by a vertically elongated slot 49 in gauge holder 48. As best shown in FIGS. 5 and 6, slot 49 slides on the central projection of T-shaped bracket 44 to vertically position gauge holder 48 and thereby gauge 28. Hand knob 50 locks the gauge holder 48 in the desired position. FIG. 6 shows that one end of hand knob 50 has a threaded fastening means 52 which is put through clearance hole 54 and adjusting bracket 44 then threaded into gauge holder 48 to secure the assembly.

In FIGS. 3–5, the conventional electronic components (not shown) of measuring apparatus 28 are housed in gauge casing 56. One end of gauge casing 56 has a threaded bore where stem 58 is inserted. Jam nuts 60 and 62 lock one end of stem 58 in engagement with gauge casing 56. The other end of stem 58 is connected to plunger 30 after being clamped in mounting bore 64 which extends horizontally through the upper portion of gauge holder 48. A set screw 66 spans lateral opening 68 which extends radially outward from mounting bore 64 to one side of gauge holder 48, as shown in FIG. 5. FIG. 3 further shows that set screw 66 can be turned to vary the clamping force applied on stem 58 by the lateral opening 68 and mounting bore 64. As a result, stem 58 can be removably clamped securely in mounting bore 64 of gauge holder 48 to suspend measuring apparatus 28.

Measuring apparatus 28 with digital readout is of the conventional type, such as the Mitutoyo IDU25E. A variety of conventional probe tips may be attached to plunger 30 of the measuring apparatus in the preferred embodiment, a probe tip 70 comprising a circular disk is attached to plunger 30. Such a probe tip is well-suited for checking the squareness of plate edges. The thickness of the plates being measured generally determines the maximum size of the probe tip. A plastic retractor 72 having a slotted mounting flange and an elongated crescent-shaped protrusion clips to the outside of plunger rod 74 to facilitate retraction of the plunger 30. The operator can pull plunger 30 back with one finger thereby protecting precision gauge 28 and plunger 30 from damage during the positioning of plate 32 for measurement. The operator releases retractor 72 when the positioning of plate 32 is complete and measurement is ready to commence as shown in FIG. 4.

The structural components of carriage arm assembly 26 are preferably fabricated from a strong, lightweight, and rigid material, such as aluminum. Detail of carriage arm assembly 26 is provided in FIGS. 4 and 5. Block 76 is mounted on the elongated horizontal bar 40 opposite gauge holder 48. Block 76 provides a means for adjustably attaching bar 40 to guide 78. The top of guide 78 has an elongated slot 80 having a dovetailed cross-section complimentary to the male dovetailed cross-section 81 on elongated slide bar 82. To facilitate precise and accurate sliding, guide 78 is preferably equipped with a series of ball bearings 84 lining each side of slot 80 at its narrowest breadth. Slide bar 82 has two ends and is precisely mounted to the underside of table surface 16 or frame 12 with its longitudinal axis perpendicular or square to the straight reference gauge 24. Guide 78 attaches to the underside of measuring table by sliding over one end of slide bar 82. Block 76 and the remainder of carriage arm assembly 26 are thereafter attached to the bottom of guide 78 to slidably mount the same square with straight reference gauge 24.

OPERATION OF THE INVENTION

As is apparent from FIG. 1, the first step of this method of checking squareness of plates is positioning the plate 32 on the measuring table 10. The plate is positioned with one edge abutting straight reference gauge 24 and an adjoining edge within the stroke path of plunger 30. As seen in FIG. 4, the operator next retracts plunger 30 of gauge 28 by using one finger on retractor 72. Then carriage arm assembly 26 is moved to a position across from the front edge of plate 32. The operator then releases plunger 30 so that tip 70 contacts the front edge of plate 32, as shown in FIGS. 3 and 4.

Measuring is performed by the operator using the squareness checking means and several sub-steps. The first sub-step is zeroing the digital readout of the gauge. As shown in FIGS. 2 and 3, the carriage arm assembly 26 is then slidably moved in either direction along the length of the front edge of plate 32 or a portion of thereof. Plunger 30 and tip 70 stays in contact with the front edge of the plate, even when it deviates from a square relationship with the edge which abutts straight reference gauge 24. When such deviations occur, their magnitude and direction are displayed on gauge 28 or signaled to microprocessor control 34 via an appropriate electrical connection.

Because of the geometrical relationship between the plate 32, the straight reference gauge 24, and the sliding carriage arm assembly 26 which holds gauge 28, the squareness of two adjoining edges of plate 32 can be determined by sliding contact along one edge. By rotating the plate 180 degrees, the operator can check the squareness of a second set of sides. It should be apparent from basic geometry that the squareness of all four corners of the plate may be determined by measuring only two diagonally opposite corners.

From the foregoing, it is apparent that the invention is useful in accomplishing the objectives stated.

I claim:

1. The device for measuring the squareness of a fabricated plate, comprising:
   a table having a flat top surface with opposite sides and ends,
   a straight reference gauge secured to said surface adjacent one end of said table and extending at right angles to the sides thereof,
   a carriage means secured to said table for longitudinal movement along one side of said surface,
   a measuring gauge rigidly mounted on said carriage means, said measuring gauge comprising a spring loaded horizontally disposed plunger element positional for direct contact with the side edge of a plate supported on said table surface, said plate further having an end edge in contact and in alignment with said reference gauge, whereby said plunger element can be longitudinally moved along the side of said surface in continuous and direct contact with the side edge of said plate to measure deviations from squareness between said side edge and said end edge of said plate.

2. The device of claim 1 wherein said measuring gauge is digital and by its contact with a side edge of said plate generates a signal indicative of deviations from squareness between said side edge and said end edge of said plate, said signal being displayed on a remote digital readout.

3. A device of claim slidably 1 wherein, said table has a bottom surface located underneath said flat top surface and said carriage means is secured to said bottom surface for longitudinal movement along one side of said flat top surface.

4. The device of claim 1 wherein said carriage means includes an attached handle disposed substantially parallel to said top surface and one of said table surface sides for sliding the carriage means longitudinally along said table surface side.

5. The device of claim 4 wherein said handle is attached to said carriage means above said measuring gauge with portions of said carriage means extending around the sides of said measuring gauge for shielding said measuring gauge from top and side impacts.

6. The device of claim 1 wherein said carriage means is comprised of an elongated rigid bar and one end of said bar is slidably mounted to said table bottom by mating and slidable means for support and said measuring gauge is rigidly mounted to the other end of said bar.

7. The device of claim 6 wherein said mating and slidable means for support have a plurality of mating surfaces and a row of rolling bearings is disposed between at least two of said mating surfaces for support and smooth sliding of said carriage means.

8. The method of determining the squareness of fabricated plate edges, comprising:
   providing a measuring table having a straight reference gauge means extending across said table, and a plunger-operated measuring gauge rigidly mounted on a carriage means which is mounted to the table and slides said plunger at right angles to said reference gauge means;
   positioning the plate on said measuring table with a first edge abutting said straight reference gauge means;
   retracting said plunger;
   moving said carriage means holding said measuring gauge to a position in front of a second edge of said plate;
   releasing said plunger slowly until it contacts the second edge;
   activating the measuring gauge;
   moving the carriage means along the length of said second edge and holding said plunger in constant and continuous contact with said second edge, whereby deviations from squareness between the first and second edges are measured by said measuring gauge;
   moving said carriage means and gauge with plunger mounted thereon clear of said plate; and
   repeating the above steps as needed to determine the squareness of other edges on the same plate.

9. The method of claim 8 wherein said plunger is retracted by the operator pulling with one finger on a retractor that is clipped to said plunger.

10. The method of claim 8 further comprising resetting said measuring gauge to zero prior to moving the carriage means and measuring squareness deviations.

11. The method of claim 8 further comprising displaying said gauge measuring squareness deviations on a digital readout.

12. The method of claim 11 wherein said gauge measuring squareness deviations sends an electrical signal indicative of same to a microprocessor for additional steps of processing, storing, and displaying squareness measurements.

* * * * *